US012804788B2

(12) United States Patent
Huang

(10) Patent No.: US 12,804,788 B2
(45) Date of Patent: Nov. 17, 2026

(54) OFFLINE VOICE-CONTROLLED CHRISTMAS LIGHT POWER CONTROLLER

(71) Applicant: NINGBO GOLDEN POWER ELECTRONIC CO., LTD., Ningbo (CN)

(72) Inventor: Yongxing Huang, Ningbo (CN)

(73) Assignee: NINGBO GOLDEN POWER ELECTRONIC CO., LTD., Ningbo (CN)

( * ) Notice: Subject to any disclaimer, the term of this patent is extended or adjusted under 35 U.S.C. 154(b) by 12 days.

(21) Appl. No.: 19/004,545

(22) Filed: Dec. 30, 2024

(65) Prior Publication Data

US 2025/0220795 A1 Jul. 3, 2025

(30) Foreign Application Priority Data

Dec. 28, 2023 (CN) ......................... 202323600692.7

(51) Int. Cl.
*H05B 47/12* (2020.01)
*G10L 15/22* (2006.01)
*H05B 47/175* (2020.01)

(52) U.S. Cl.
CPC ............ *H05B 47/197* (2024.01); *G10L 15/22* (2013.01); *G10L 2015/223* (2013.01)

(58) Field of Classification Search
CPC .... H05B 47/12; H05B 47/105; H05B 47/155; H05B 47/183; H05B 47/185; H05B 47/196; H05B 47/197
See application file for complete search history.

(56) References Cited

U.S. PATENT DOCUMENTS

| | | | | |
|---|---|---|---|---|
| 9,642,225 | B1 * | 5/2017 | Ng | G10L 17/20 |
| 12,245,344 | B2 * | 3/2025 | Aliakseyeu | H05B 47/115 |
| 2016/0227633 | A1 * | 8/2016 | Sun | H05B 47/19 |
| 2016/0366746 | A1 * | 12/2016 | van de Ven | F21V 29/74 |
| 2018/0078072 | A1 | 3/2018 | Loomis | |
| 2024/0431005 | A1 * | 12/2024 | Aliakseyeu | H05B 47/12 |

FOREIGN PATENT DOCUMENTS

| | | | |
|---|---|---|---|
| CN | 209949491 | U | 1/2020 |
| DE | 202023102347 | U1 | 5/2023 |

* cited by examiner

*Primary Examiner* — Tung X Le
(74) *Attorney, Agent, or Firm* — Bayramoglu Law Offices LLC

(57) ABSTRACT

An offline voice-controlled Christmas light power controller includes: a power supply module, and an input end of the power supply module is electrically connected with an alternating current live line and an alternating current neutral line; a master control module, and a power supply end of the master control module is electrically connected with an output end of the power supply module; a voice recognition module; and a driving module. The master control module controls the driving module to start up to turn on or off the light strip based on whether the startup signal is received. The voice recognition module recognizes a voice collected by the microphone and starts up or shuts down the driving module based on the voice, without manual operation, bringing much convenience.

11 Claims, 2 Drawing Sheets

OFFLINE VOICE-CONTROLLED CHRISTMAS LIGHT POWER CONTROLLER

CROSS-REFERENCE TO THE RELATED APPLICATIONS

This application is based upon and claims priority to Chinese Patent Application No. 202323600692.7, filed on Dec. 28, 2023, the entire contents of which are incorporated herein by reference.

TECHNICAL FIELD

The present disclosure relates to the technical field of power controllers and in particular to an offline voice-controlled Christmas light power controller.

BACKGROUND

Along with development of sciences and technologies, light strips may be mounted in some festivals, for example, in Christmas Day, to create a festival atmosphere with the light of the light strips.

On the current markets, the existing light strips are usually turned on or off by a physical button, namely, by a button on a controller. Of course, some light strips are turned on or off by infrared remote control or Bluetooth. However, these control modes all require manual operation, leading to much inconvenience.

SUMMARY

The technical problem to be solved by the present disclosure is to provide an offline voice-controlled Christmas light power controller to solve the problem of inconvenience of turning on the light strips in the prior arts.

In order to address the above issue, the present disclosure provides the following technical solution: an offline voice-controlled Christmas light power controller, which comprises:

- a power supply module, where an input end of the power supply module is electrically connected with an alternating current (AC) live line and an AC neutral line;
- a master control module, where a power supply end of the master control module is electrically connected with an output end of the power supply module;
- a voice recognition module, where a power supply end of the voice recognition module is electrically connected with the output end of the power supply module; an input end of the voice recognition module is electrically connected with a microphone U6; an output end of the voice recognition module is electrically connected with the master control module; the voice recognition module sends a startup signal to the master control module based on voice activation words collected by the microphone U6;
- a driving module, where an input end of the driving module is electrically connected with the master control module; an output end of the driving module is electrically connected with a light strip; the master control module controls the driving module to start up to turn on or off the light strip based on whether the startup signal is received.

Compared with the prior arts, the present disclosure has the following advantages: the voice recognition module recognizes a voice collected by the microphone and starts up or shuts down the driving module based on the voice, without manual operation, bringing much convenience.

Preferably, the power supply module comprises an AC-to-Direct Current (DC) circuit, a first voltage stabilizing circuit for providing power supply for the driving module, and a second voltage stabilizing circuit for providing power supply for the master control module and the voice recognition module. An input end of the alternating current-to-direct current (AC-to-DC) circuit is electrically connected with the AC live line or AC neutral line. A first output end of the AC-to-DC circuit is electrically connected with an input end of the first voltage stabilizing circuit. A second output end of the AC-to-DC circuit is electrically connected with is an input end of the second voltage stabilizing circuit. An output end of the first voltage stabilizing circuit is electrically connected with a power supply end of the driving module. An output end of the second voltage stabilizing circuit is electrically connected with the power supply end of the master control module and the power supply end of the voice recognition module.

The technical solution can achieve the following technical effect: an AC is firstly converted by the AC-to-DC circuit into a DC desired by each module, and then the voltage supplied to the light strip via the driving module is stabilized by the first voltage stabilizing circuit; finally, stable power supply is provided by the second voltage stabilizing circuit to the master control module and the voice recognition module.

Preferably, the second voltage stabilizing circuit comprises a diode D8, a resistor R10, capacitors C9, C10 and C11, and a voltage stabilizing chip U2. A positive pole of the diode D8 is electrically connected with the second output end of the AC-to-DC circuit. A negative pole of the diode D8 is electrically connected with an input end of the voltage stabilizing chip U2. The voltage stabilizing chip U2 is grounded by the capacitor C9 and the resistor R10 respectively. A grounding end of the voltage stabilizing chip U2 is grounded. An output end of the voltage stabilizing chip U2 is the output end of the second voltage stabilizing circuit. The output end of the voltage stabilizing chip U2 is grounded by the capacitor C10 and the capacitor C11 respectively.

The technical solution can achieve the following technical effect: by the voltage stabilizing chip U2, stable power supply can be provided to the master control module and the voice recognition module. Further, the resistor R10, the capacitor C9, the capacitor C10 and the capacitor C11 each can ensure stable input and output signals, achieving filtering and rectification effect.

Preferably, the voice recognition module comprises a voice recognition chip U4; a power supply end of the voice recognition chip U4 is electrically connected with the output end of the second voltage stabilizing circuit; a grounding end of the voice recognition chip U4 is grounded; the voice recognition chip U4 is electrically connected with the master control module; two pins of the voice recognition chip U4 are electrically connected with a positive pole of the microphone U6 by a resistor and a capacitor respectively; a negative pole of the microphone U6 is grounded; a capacitor C15 is electrically connected between the positive pole and the negative pole of the microphone U6.

The technical solution can achieve the following technical effect: two pins of the microphone U6 are connected with the voice recognition chip U4 by a resistor and a capacitor respectively, which ensures a voice signal recognized by the microphone U6 can be stably input into the voice recognition chip U4.

Preferably, the master control module comprises a master control chip U3, a switch SW1 and an indicator lamp LED; a power supply end of the master control chip U3 is electrically connected with the output end of the second voltage stabilizing circuit; a grounding end of the master control chip U3 is grounded; two IO ports of the master control chip U3 are grounded by the switch SW1 and the indicator lamp LED respectively.

The technical solution can achieve the following technical effect: with the switch SW1, the entire controller can also be turned on by manual operation. It can be avoided that after damage to the voice recognition module, the controller cannot start up the driving module. Further, the indicator lamp indicates whether the switch SW1 is depressed.

Preferably, an infrared reception circuit for receiving an infrared transmission signal is further comprised. The master control module controls, based on the infrared transmission signal received by the infrared reception circuit, the driving module to start up to turn on or off the light strip. The infrared reception circuit comprises an infrared receiving head QP1. A power supply end of the infrared receiving head QP1 is electrically connected with the output end of the second voltage stabilizing circuit. The power supply end of the infrared receiving head QP1 is grounded by the capacitor C15. A grounding end of the infrared receiving head QP1 is grounded. A signal output end of the infrared receiving head QP1 is electrically connected with the master control module.

The technical solution can achieve the following technical effect: with the infrared reception circuit, the controller can also start up the driving module by receiving the infrared signal and hence turn on or off the light strip.

Preferably, the first voltage stabilizing circuit comprises resistors R1 and R9, capacitors C3 and C8, and a diode D7. A positive pole of the diode D7 is electrically connected with the first output end of the AC-to-DC circuit. A negative pole of the diode D7 is the output end of the first voltage stabilizing circuit. The resistor R9 and the capacitor C8 are series-connected and then parallel-connected between two ends of the diode D7. The negative pole of the diode D7 is grounded by the capacitor C3. The negative pole of the diode D7 is grounded by the resistor R1.

The technical solution can achieve the following technical effect: with the diode D7, a short circuiting current generated at the time of short circuiting of the driving module and the light strip can be prevented from bypassing the diode D7 to damage the power supply. Filtering and rectification are performed by the capacitor C3 and the resistor R1 to ensure stable output signal of the power supply.

Preferably, the driving module comprises triodes Q2, Q3, Q4 and Q5; the master control module is electrically connected with a base electrode of the triode Q2 by a resistor R18, the base electrode of the triode Q2 is grounded by a resistor R12. The master control module is electrically connected with a base electrode of the triode Q3 by a resistor R19, and the base electrode of the triode Q3 is grounded by a resistor R11. An emitter electrode of the triode Q2 and an emitter electrode of the triode Q3 are both grounded. A resistor R22 is electrically connected between a collector electrode of the triode Q2 and a collector electrode of the triode Q3. The collector electrode of the triode Q2 is electrically connected with one end of the light strip, and the collector electrode of the triode Q3 is electrically connected with the other end of the light strip. A base electrode of the triode Q4 is electrically connected with an emitter electrode of the triode Q4 by a resistor R14. The base electrode of the triode Q4 is electrically connected with a collector electrode of the triode Q5 by a resistor R16. A base electrode of the triode Q5 is electrically connected with an emitter electrode of the triode Q5 by a resistor R13. The base electrode of the triode Q5 is electrically connected with the emitter electrode of the triode Q4 by a resistor 17. The emitter electrode of the triode Q4 is electrically connected with the emitter electrode of the triode Q2. The emitter electrode of the triode Q5 is electrically connected with the emitter electrode of the triode Q3. The emitter electrode of the triode Q4 and the emitter electrode of the triode Q5 each are electrically connected with the output end of the first voltage stabilizing circuit.

The technical solution can achieve the following technical effect: with different conduction results of the four triodes, forward current or reverse current is supplied to the light strip, realizing different turn-on effects of the light strips.

DETAILED DESCRIPTION OF THE EMBODIMENTS

In order to make the above objects, features, and advantages of the present disclosure clearer and more intelligible, the specific embodiments of the present disclosure will be detailed below in combination with the drawings.

Figure 1:
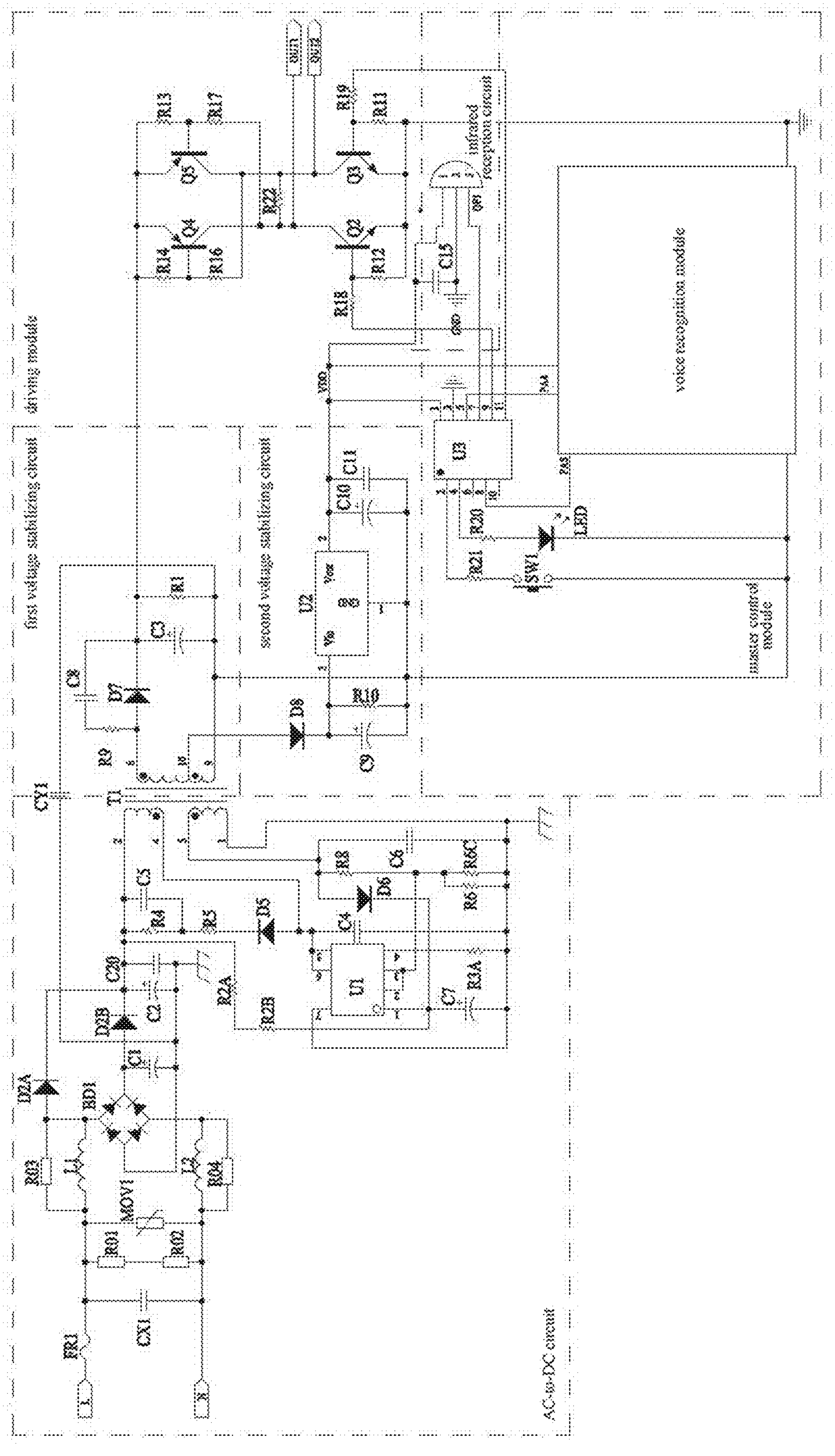
FIG. 1 is a circuit diagram illustrating an offline voice-controlled Christmas light power controller according to an embodiment of the present disclosure.
Figure 2:
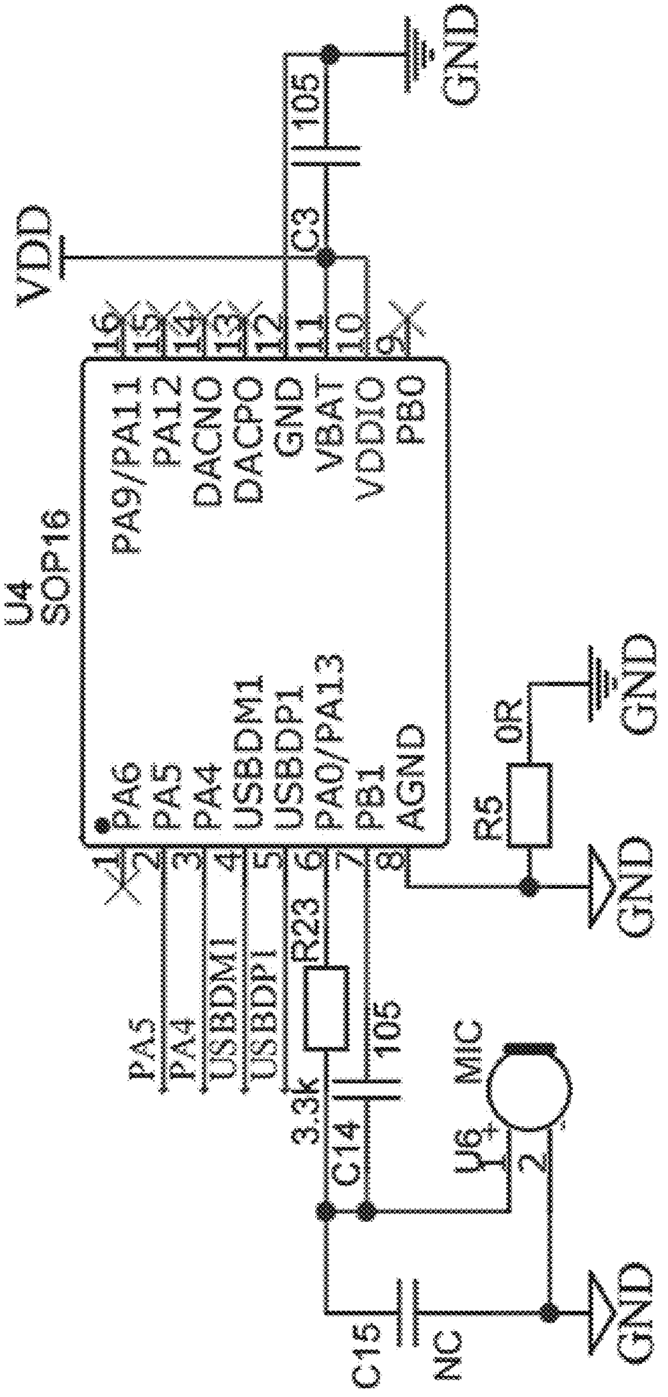
FIG. 2 is a circuit diagram illustrating a voice recognition module in an offline voice-controlled Christmas light power controller according to an embodiment of the present disclosure.

As shown in FIGS. 1 and 2, an embodiment of the present disclosure provides an offline voice-controlled Christmas light power controller, which comprises:

- a power supply module, configured to provide a working power supply, where an input end of the power supply module is electrically connected with an alternating current (AC) live line and an AC neutral line;
- a master control module, where a power supply end of the master control module is electrically connected with an output end of the power supply module;
- a voice recognition module, where a power supply end of the voice recognition module is electrically connected with the output end of the power supply module; an input end of the voice recognition module is electrically connected with a microphone U6; an output end of the voice recognition module is electrically connected with the master control module; the voice recognition module sends a startup signal to the master control module based on voice activation words collected by the microphone U6;
- a driving module, where an input end of the driving module is electrically connected with the master control module; an output end of the driving module is electrically connected with a light strip; the master control module controls the driving module to start up to turn on or off the light strip based on whether the startup signal is received.

The voice recognition module recognizes a voice collected by the microphone and activates the driving module based on the voice, without manual operation, bringing much convenience.

In this embodiment, the power supply module comprises an AC-to-Direct Current (DC) circuit, a first voltage stabilizing circuit for providing power supply for the driving module, and a second voltage stabilizing circuit for providing power supply for the master control module and the voice recognition module.

An input end of the AC-to-DC circuit is electrically connected with the AC live line or AC neutral line. A first output end of the AC-to-DC circuit is electrically connected with an input end of the first voltage stabilizing circuit. A second output end of the AC-to-DC circuit is electrically connected with is an input end of the second voltage stabilizing circuit. An output end of the first voltage stabilizing circuit is electrically connected with a power supply end of the driving module. An output end of the second voltage stabilizing circuit is electrically connected with the power supply end of the master control module and the power supply end of the voice recognition module.

An AC is firstly converted by the AC-to-DC circuit into a DC desired by each module, and then the voltage supplied to the light strip via the driving module is stabilized by the first voltage stabilizing circuit; finally, stable power supply is provided by the second voltage stabilizing circuit to the master control module and the voice recognition module.

The AC-to-DC circuit is a circuit in the prior art, and two output ends are finally implemented by a transformer. One output end is electrically connected to the first voltage stabilizing circuit and the other output end is electrically connected to the second voltage stabilizing circuit.

In the practical uses, the voltage value required by the light strip is higher than the voltage value required by the master control module. Therefore, the voltage value output by the first voltage stabilizing circuit is also higher than the voltage value output by the second voltage stabilizing circuit.

The second voltage stabilizing circuit comprises a diode D8, a resistor R10, capacitors C9, C10 and C11, and a voltage stabilizing chip U2.

A positive pole of the diode D8 is electrically connected with the second output end of the AC-to-DC circuit. A negative pole of the diode D8 is electrically connected with an input end of the voltage stabilizing chip U2. The voltage stabilizing chip U2 is grounded by the capacitor C9 and the resistor R10 respectively. A grounding end of the voltage stabilizing chip U2 is grounded. An output end of the voltage stabilizing chip U2 is the output end of the second voltage stabilizing circuit. The output end of the voltage stabilizing chip U2 is grounded by the capacitor C10 and the capacitor C11 respectively.

By the voltage stabilizing chip U2, stable power supply can be provided to the master control module and the voice recognition module. Further, the resistor R10, the capacitor C9, the capacitor C10 and the capacitor C11 each can ensure stable input and output signals, achieving filtering and rectification effect.

The voice recognition module comprises a voice recognition chip U4; a power supply end of the voice recognition chip U4 is electrically connected with the output end of the second voltage stabilizing circuit; a grounding end of the voice recognition chip U4 is grounded; the voice recognition chip U4 is electrically connected with the master control module; two pins of the voice recognition chip U4 are electrically connected with a positive pole of the microphone U6 by a resistor and a capacitor respectively; a negative pole of the microphone U6 is grounded; a capacitor C15 is electrically connected between the positive pole and the negative pole of the microphone U6.

Two pins of the microphone U6 are connected with the voice recognition chip U4 by a resistor and a capacitor respectively, which ensures a voice signal recognized by the microphone U6 can be stably input into the voice recognition chip U4.

In the embodiment, the voice recognition chip U4 may be an offline voice recognition chip such as HY7215B and HY6805C and the like. Activation words and statements such as Xiaoxin, turn on the light, turn off the light and the like are input in advance into the chip by software. The voice recognition chip U4 can, after receiving the activation words and statements collected by the microphone, send the activation words and statements to the master control module. The master control module can control the driving module to turn on or off the light strip. In this way, the light strip can be turned on or off without contact with the product and use of cloud data.

The master control module comprises a master control chip U3, a switch SW1 and an indicator lamp LED; a power supply end of the master control chip U3 is electrically connected with the output end of the second voltage stabilizing circuit; a grounding end of the master control chip U3 is grounded; two IO ports of the master control chip U3 are grounded by the switch SW1 and the indicator lamp LED respectively.

With the switch SW1, the entire controller can also be turned on by manual operation. It can be avoided that after damage to the voice recognition module, the controller cannot start up the driving module. Further, the indicator lamp indicates whether the switch SW1 is depressed.

In the embodiment, the offline voice-controlled Christmas light power controller further comprises an infrared reception circuit for receiving an infrared transmission signal. The master control module controls, based on the infrared transmission signal received by the infrared reception circuit, the driving module to start up to turn on or off the light strip.

The infrared reception circuit comprises an infrared receiving head QP1. A power supply end of the infrared receiving head QP1 is electrically connected with the output end of the second voltage stabilizing circuit. The power supply end of the infrared receiving head QP1 is grounded by the capacitor C15. A grounding end of the infrared receiving head QP1 is grounded. A signal output end of the infrared receiving head QP1 is electrically connected with the master control module.

With the infrared reception circuit, the controller can also start up the driving module by receiving the infrared signal and hence turn on or off the light strip.

The first voltage stabilizing circuit comprises resistors R1 and R9, capacitors C3 and C8, and a diode D7. A positive pole of the diode D7 is electrically connected with the first output end of the AC-to-DC circuit. A negative pole of the diode D7 is the output end of the first voltage stabilizing circuit. The resistor R9 and the capacitor C8 are series-connected and then parallel-connected between two ends of the diode D7. The negative pole of the diode D7 is grounded by the capacitor C3. The negative pole of the diode D7 is grounded by the resistor R1.

With the diode D7, a short circuiting current generated at the time of short circuiting of the driving module and the light strip can be prevented from bypassing the diode D7 to damage the power supply. Filtering and rectification are performed by the capacitor C3 and the resistor R1 to ensure stable output signal of the power supply.

In the embodiment, the driving module comprises triodes Q2, Q3, Q4 and Q5.

The master control module is electrically connected with a base electrode of the triode Q2 by a resistor R18, and the base electrode of the triode Q2 is grounded by a resistor R12.

The master control module is electrically connected with a base electrode of the triode Q3 by a resistor R19, and the base electrode of the triode Q3 is grounded by a resistor R11. An emitter electrode of the triode Q2 and an emitter electrode of the triode Q3 are both grounded. A resistor R22 is electrically connected between a collector electrode of the triode Q2 and a collector electrode of the triode Q3. The collector electrode of the triode Q2 is electrically connected with one end of the light strip, and the collector electrode of the triode Q3 is electrically connected with the other end of the light strip.

A base electrode of the triode Q4 is electrically connected with an emitter electrode of the triode Q4 by a resistor R14. The base electrode of the triode Q4 is electrically connected with a collector electrode of the triode Q5 by a resistor R16. A base electrode of the triode Q5 is electrically connected with an emitter electrode of the triode Q5 by a resistor R13. The base electrode of the triode Q5 is electrically connected with the emitter electrode of the triode Q4 by a resistor 17. The emitter electrode of the triode Q4 is electrically connected with the emitter electrode of the triode Q2. The emitter electrode of the triode Q5 is electrically connected with the emitter electrode of the triode Q3. The emitter electrode of the triode Q4 and the emitter electrode of the triode Q5 each are electrically connected with the output end of the first voltage stabilizing circuit.

With different conduction results of the four triodes, forward current or reverse current is supplied to the light strip, realizing different turn-on effects of the light strips.

The present disclosure has the following beneficial effects: the voice recognition module recognizes a voice collected by the microphone and activates the driving module based on the voice, without manual operation, bringing much convenience. Furthermore the driving module can also be started up by manual operation or infrared remote control.

The above are illustrated and described several preferred embodiments of the present disclosure. As mentioned above, it should be understood that the present disclosure is not limited to the forms disclosed herein and shall not be considered as exclusion to other embodiments but can be used in various other combinations, modification or environments and also can be modified based on the above teaching or the technology or knowledge in the relevant field within the scope devised by the present disclosure. Any modifications or changes made by those skilled in the arts within the spirit and scope of the present disclosure shall fall within the scope of protection of the appended claims of the present disclosure.

Although the disclosure is made as above, the scope of protection of the present disclosure is not limited hereto. Various modifications and changes made by those skilled in the arts without the spirit and scope of the present disclosure shall fall within the scope of protection of the present disclosure.

What is claimed is:

1. An offline voice-controlled Christmas light power controller, comprising:

a power supply module, wherein an input end of the power supply module is electrically connected with an alternating current live line and an alternating current neutral line;

a master control module, wherein a power supply end of the master control module is electrically connected with an output end of the power supply module;

a voice recognition module, wherein a power supply end of the voice recognition module is electrically connected with the output end of the power supply module; an input end of the voice recognition module is electrically connected with a microphone U6; an output end of the voice recognition module is electrically connected with the master control module; the voice recognition module sends a startup signal to the master control module based on voice activation words collected by the microphone U6;

a driving module, wherein an input end of the driving module is electrically connected with the master control module; an output end of the driving module is electrically connected with a light strip;

the master control module controls the driving module to start up to turn on or off the light strip based on whether the startup signal is received, wherein the power supply module comprises an alternating current-to-direct current (AC-to-DC) circuit, a first voltage stabilizing circuit for providing power supply for the driving module, and a second voltage stabilizing circuit for providing power supply for the master control module and the voice recognition module;

an input end of the AC-to-DC circuit is electrically connected with the alternating current live line or alternating current neutral line; a first output end of the AC-to-DC circuit is electrically connected with an input end of the first voltage stabilizing circuit; a second output end of the AC-to-DC circuit is electrically connected with an input end of the second voltage stabilizing circuit; an output end of the first voltage stabilizing ciruit is electrically connected with a power supply end of the driving module;

an output end of the second voltage stabilizing circuit is electrically connected with the power supply end of the master control module and the power supply end of the voice recognition module.

2. The offline voice-controlled Christmas light power controller according to claim 1, wherein the second voltage stabilizing circuit comprises a diode D8, a resistor R10, capacitors C9, C10 and C11, and a voltage stabilizing chip U2; a positive pole of the diode D8 is electrically connected with the second output end of the AC-to-DC circuit; a negative pole of the diode D8 is electrically connected with an input end of the voltage stabilizing chip U2; the voltage stabilizing chip U2 is grounded by the capacitor C9 and the resistor R10 respectively; a grounding end of the voltage stabilizing chip U2 is grounded; an output end of the voltage stabilizing chip U2 is the output end of the second voltage stabilizing circuit; the output end of the voltage stabilizing chip U2 is grounded by the capacitor C10 and the capacitor C11 respectively.

3. The offline voice-controlled Christmas light power controller according to claim 2, wherein the voice recognition module comprises a voice recognition chip U4; a power supply end of the voice recognition chip U4 is electrically connected with the output end of the second voltage stabilizing circuit; a grounding end of the voice recognition chip U4 is grounded; the voice recognition chip U4 is electrically connected with the master control module; two pins of the voice recognition chip U4 are electrically connected with a positive pole of the microphone U6 by a resistor and a capacitor respectively; a negative pole of the microphone U6 is grounded; a capacitor C15 is electrically connected between the positive pole and the negative pole of the microphone U6.

4. The offline voice-controlled Christmas light power controller according to claim 2, wherein the master control module comprises a master control chip U3, a switch SW1 and an indicator lamp LED; a power supply end of the master control chip U3 is electrically connected with the output end of the second voltage stabilizing circuit; a grounding end of the master control chip U3 is grounded; two IO ports of the master control chip U3 are grounded by the switch SW1 and the indicator lamp LED respectively.

5. The offline voice-controlled Christmas light power controller according to claim 2, wherein an infrared reception circuit for receiving an infrared transmission signal is further comprised; the master control module controls, based on the infrared transmission signal received by the infrared reception circuit, the driving module to start up to turn on or off the light strip; the infrared reception circuit comprises an infrared receiving head QP1; a power supply end of the infrared receiving head QP1 is electrically connected with the output end of the second voltage stabilizing circuit; the power supply end of the infrared receiving head QP1 is grounded by a capacitor C15; a grounding end of the infrared receiving head QP1 is grounded; a signal output end of the infrared receiving head QP1 is electrically connected with the master control module.

6. The offline voice-controlled Christmas light power controller according to claim 1, wherein the voice recognition module comprises a voice recognition chip U4; a power supply end of the voice recognition chip U4 is electrically connected with the output end of the second voltage stabilizing circuit; a grounding end of the voice recognition chip U4 is grounded; the voice recognition chip U4 is electrically connected with the master control module; two pins of the voice recognition chip U4 are electrically connected with a positive pole of the microphone U6 by a resistor and a capacitor respectively; a negative pole of the microphone U6 is grounded; a capacitor C15 is electrically connected between the positive pole and the negative pole of the microphone U6.

7. The offline voice-controlled Christmas light power controller according to claim 1, wherein the master control module comprises a master control chip U3, a switch SW1 and an indicator lamp LED; a power supply end of the master control chip U3 is electrically connected with the output end of the second voltage stabilizing circuit; a grounding end of the master control chip U3 is grounded; two IO ports of the master control chip U3 are grounded by the switch SW1 and the indicator lamp LED respectively.

8. The offline voice-controlled Christmas light power controller according to claim 1, wherein an infrared reception circuit for receiving an infrared transmission signal is further comprised; the master control module controls, based on the infrared transmission signal received by the infrared reception circuit, the driving module to start up to turn on or off the light strip;

the infrared reception circuit comprises an infrared receiving head QP1; a power supply end of the infrared receiving head QP1 is electrically connected with the output end of the second voltage stabilizing circuit; the power supply end of the infrared receiving head QP1 is grounded by a capacitor C15; a grounding end of the infrared receiving head QP1 is grounded; a signal output end of the infrared receiving head QP1 is electrically connected with the master control module.

9. The offline voice-controlled Christmas light power controller according to claim 1, wherein the first voltage stabilizing circuit comprises resistors R1 and R9, capacitors C3 and C8, and a diode D7; a positive pole of the diode D7 is electrically connected with the first output end of the AC-to-DC circuit; a negative pole of the diode D7 is the output end of the first voltage stabilizing circuit; the resistor R9 and the capacitor C8 are series-connected and parallel-connected between two ends of the diode D7; the negative pole of the diode D7 is grounded by the capacitor C3;

the negative pole of the diode D7 is grounded by the resistor R1.

10. The offline voice-controlled Christmas light power controller according to claim 9, wherein the driving module comprises triodes Q2, Q3, Q4 and Q5;

the master control module is electrically connected with a base electrode of the triode Q2 by a resistor R18, the base electrode of the triode Q2 is grounded by a resistor R12;

the master control module is electrically connected with a base electrode of the triode Q3 by a resistor R19, and the base electrode of the triode Q3 is grounded by a resistor R11;

an emitter electrode of the triode Q2 and an emitter electrode of the triode Q3 are both grounded;

a resistor R22 is electrically connected between a collector electrode of the triode Q2 and a collector electrode of the triode Q3;

the collector electrode of the triode Q2 is electrically connected with a first end of the light strip, and the collector electrode of the triode Q3 is electrically connected with a second end of the light strip;

a base electrode of the triode Q4 is electrically connected with an emitter electrode of the triode Q4 by a resistor R14;

the base electrode of the triode Q4 is electrically connected with a collector electrode of the triode Q5 by a resistor R16;

a base electrode of the triode Q5 is electrically connected with an emitter electrode of the triode Q5 by a resistor R13;

the base electrode of the triode Q5 is electrically connected with the emitter electrode of the triode Q4 by a resistor R17;

the emitter electrode of the triode Q4 is electrically connected with the emitter electrode of the triode Q2;

the emitter electrode of the triode Q5 is electrically connected with the emitter electrode of the triode Q3; and the emitter electrode of the triode Q4 and the emitter electrode of the triode Q5 each are electrically connected with the output end of the first voltage stabilizing circuit.

11. The offline voice-controlled Christmas light power controller according to claim 1, wherein the driving module comprises triodes Q2, Q3, Q4 and Q5;

the master control module is electrically connected with a base electrode of the triode Q2 by a resistor R18, the base electrode of the triode Q2 is grounded by a resistor R12;

the master control module is electrically connected with a base electrode of the triode Q3 by a resistor R19, and the base electrode of the triode Q3 is grounded by a resistor R11;

an emitter electrode of the triode Q2 and an emitter electrode of the triode Q3 are both grounded;

a resistor R22 is electrically connected between a collector electrode of the triode Q2 and a collector electrode of the triode Q3;

the collector electrode of the triode Q2 is electrically connected with a first end of the light strip, and the collector electrode of the triode Q3 is electrically connected with a second end of the light strip;

a base electrode of the triode Q4 is electrically connected with an emitter electrode of the triode Q4 by a resistor R14;

the base electrode of the triode Q4 is electrically connected with a collector electrode of the triode Q5 by a resistor R16;

a base electrode of the triode Q5 is electrically connected with an emitter electrode of the triode Q5 by a resistor R13;

the base electrode of the triode Q5 is electrically connected with the emitter electrode of the triode Q4 by a resistor R17;

the emitter electrode of the triode Q4 is electrically connected with the emitter electrode of the triode Q2;

the emitter electrode of the triode Q5 is electrically connected with the emitter electrode of the triode Q3; and the emitter electrode of the triode Q4 and the emitter electrode of the triode Q5 each are electrically connected with the output end of the first voltage stabilizing circuit.

* * * * *